(12) United States Patent
Rosano et al.

(10) Patent No.: US 9,428,972 B2
(45) Date of Patent: Aug. 30, 2016

(54) SIMULTANEOUS CLAMP AND TORQUE DRIVE

(71) Applicant: National Oilwell Varco Norway AS, Kristiansand S (NO)

(72) Inventors: Hugo Leonardo Rosano, Mosby (NO); Lopek Drzewiecki, Edmonton (CA)

(73) Assignee: NATIONAL OILWELL VARCO NORWAY AS, Kristiansand S (NO)

( * ) Notice: Subject to any disclaimer, the term of this patent is extended or adjusted under 35 U.S.C. 154(b) by 307 days.

(21) Appl. No.: 14/344,802

(22) PCT Filed: Sep. 28, 2012

(86) PCT No.: PCT/US2012/058001
§ 371 (c)(1),
(2) Date: Mar. 13, 2014

(87) PCT Pub. No.: WO2013/049627
PCT Pub. Date: Apr. 4, 2013

(65) Prior Publication Data
US 2014/0345426 A1    Nov. 27, 2014

Related U.S. Application Data

(60) Provisional application No. 61/540,763, filed on Sep. 29, 2011.

(51) Int. Cl.
*E21B 19/16* (2006.01)
*F16H 1/46* (2006.01)

(52) U.S. Cl.
CPC ............. *E21B 19/161* (2013.01); *E21B 19/164* (2013.01); *F16H 1/46* (2013.01)

(58) Field of Classification Search
CPC ..... E21B 19/161; E21B 19/164; E21B 19/00; E21B 19/16; B25B 13/50; F16H 1/46; F16H 1/34; F16H 2001/289; F16H 2001/2872
See application file for complete search history.

(56) References Cited

U.S. PATENT DOCUMENTS 4,437,363 A * 3/1984 Haynes ................. E21B 19/164
                                                    81/57.18
4,739,681 A    4/1988 Pietras
(Continued)

FOREIGN PATENT DOCUMENTS

EP          0474481 A2    3/1992

OTHER PUBLICATIONS

Korean Office Action dated May 26, 2015, for Korean Application No. 10-2014-7010541 (3 p.).

(Continued)

*Primary Examiner* — David B Thomas
(74) *Attorney, Agent, or Firm* — Conley Rose, P.C.

(57) ABSTRACT

A clamping system for making and breaking threaded connections between a first tubular and a second tubular comprises a clamp assembly. The clamp assembly includes a first cam gear, a first plurality of clamp members disposed within the first cam gear, and a torque gear. Each clamp member is pivotally coupled to the torque gear. Each clamp member is configured to pivot between a withdraw position radially spaced apart from the first tubular and a gripping position engaging the first tubular. In addition, the clamping system comprises a clamp actuator. The clamp actuator includes a mounting shaft, a first clamp drive gear rotatably coupled to the mounting shaft, and a torque drive gear rotatably coupled to the mounting shaft. The first clamp drive gear is configured to rotate the first cam gear and the torque drive gear is configured to rotate the torque gear.

30 Claims, 8 Drawing Sheets

(56) References Cited

U.S. PATENT DOCUMENTS

| | | | | |
|---|---|---|---|---|
| 5,172,613 | A * | 12/1992 | Wesch, Jr. | ............ E21B 19/164 |
| | | | | 81/57.11 |
| 5,271,298 | A | 12/1993 | Gazel-Anthoine | |
| 5,394,774 | A | 3/1995 | Dlask | |
| 6,527,658 | B2 * | 3/2003 | Holmes | ................. B60K 6/365 |
| | | | | 475/317 |
| 6,527,671 | B2 * | 3/2003 | Paalasmaa | ................ F16H 3/72 |
| | | | | 477/104 |
| 6,988,428 | B1 | 1/2006 | Kathan | |
| 7,506,564 | B2 * | 3/2009 | Schulze-Beckinghausen | ..... E21B 19/164 |
| | | | | 81/57.19 |
| 8,215,196 | B2 * | 7/2012 | Buck | .................... E21B 19/164 |
| | | | | 74/335 |
| 8,291,791 | B2 * | 10/2012 | Light | ................... E21B 19/164 |
| | | | | 81/57.16 |
| 8,388,481 | B2 * | 3/2013 | Han | ......................... F03D 9/02 |
| | | | | 180/364 |
| 8,641,570 | B2 * | 2/2014 | Han | ....................... F03D 11/00 |
| | | | | 475/170 |
| 9,010,219 | B2 * | 4/2015 | Feigel, Jr. | ............. E21B 19/164 |
| | | | | 81/57.15 |
| 2005/0011312 | A1 | 1/2005 | Mardian | |
| 2008/0022811 | A1 | 1/2008 | Kathan | |
| 2010/0263495 | A1 | 10/2010 | Webb | |
| 2011/0041656 | A1 * | 2/2011 | Dagenais | ............. E21B 19/164 |
| | | | | 81/57.15 |
| 2012/0198954 | A1 * | 8/2012 | Musemeche | ......... E21B 19/164 |
| | | | | 74/414 |
| 2014/0305265 | A1 * | 10/2014 | Haughom | ............. E21B 19/164 |
| | | | | 81/57.11 |

OTHER PUBLICATIONS

English Summary of Korean Office Action dated May 26, 2015, for Korean Application No. 10-2014-7010541 (4 p.).

PCT/US2012/058001 International Search Report and Written Opinion Dated Nov. 5, 2013 (16 p.).

Canadian Office Action dated Jan. 29, 2015; Canadian Application No. 2,850,005 (3 p.).

* cited by examiner

SIMULTANEOUS CLAMP AND TORQUE DRIVE

CROSS-REFERENCE TO RELATED APPLICATIONS

This application is a 35 U.S.C. §371 national stage application of PCT/US2010/058001 filed Sep. 28, 2012, and entitled "Simultaneous Claim and Torque Drive," which claims benefit of U.S. provisional patent application Ser. No. 61/540,763 filed Sep. 29, 2011, and entitled "Simultaneous Clamp and Torque Drive," each of which are hereby incorporated herein by reference in their entirety.

STATEMENT REGARDING FEDERALLY SPONSORED RESEARCH OR DEVELOPMENT

Not applicable.

BACKGROUND

1. Field of the Disclosure

The present invention relates generally to methods and apparatus for gripping and manipulating pipe. More particularly, the present invention relates to systems and methods for facilitating the connection and disconnection of sections of drill pipe.

2. Background Information

Drill strings used in rotary drilling operations for the recovery of hydrocarbons are often constructed from individual lengths of drill pipe connected end-to-end to form a drill string. The individual lengths of drill pipe are typically joined by threaded connections. Because of the loads incurred by the drill string, the connections have to be pre-loaded with a certain amount of torque in order to maintain a satisfactory connection during use.

Pipe tongs are one tool used for facilitating the connection and disconnection, or making and breaking, of drill pipe connections. Pipe tongs are generally located at the drill floor and operate by gripping a connection between two adjacent lengths of pipe and applying torque to loosen or tighten the connection. Many pipe tongs operate by gripping above and below the junction between two adjacent pipe sections. The tongs then rotate the two sections of pipe relative to each other.

To make or break a connection between two pipes, more than one revolution of the two sections of pipe relative to each other is required. Multiple revolutions can be achieved by repeated twisting and releasing one of the tubulars or by multiple rotations without releasing grip from the tubular, depending on the system design. Repeated engagement, rotation, and release to achieve the desired number of revolutions requires multiple steps, which may be time consuming. In addition, achieving multiple rotations without releasing grip using hydraulically actuated tongs requires the use of a rotating hydraulic coupling, which represents a potential point of failure and/or safety concern. In cases where multiple rotations without releasing grip are driven by co-mounted electric motors, the use of commutator rings and bushings provide a relatively bulky rotating assembly that may present safety and maintenance issues.

Accordingly, there remains a need in the art for systems and methods for facilitating the connection and disconnection of pipe sections, which overcome some of the foregoing difficulties while providing more advantageous overall results.

BRIEF SUMMARY OF THE DISCLOSURE

These and other needs in the art are addressed in one embodiment by a clamping system for making and breaking threaded connections between a first tubular and a second tubular. In an embodiment, the clamping system comprises a clamp assembly for gripping and rotating the first tubular relative to the second tubular. The clamp assembly has a central axis and includes a first cam gear, a first plurality of clamp members disposed within the first cam gear, and a torque gear. The first cam gear has a radially inner surface comprising a plurality of circumferentially adjacent concave recesses defining a plurality of circumferentially adjacent cam surfaces. One clamp member of the first plurality of clamp members is disposed in each recess of the first cam gear. Each clamp member is pivotally coupled to the torque gear. Each clamp member is configured to pivot between a withdraw position radially spaced apart from the first tubular and a gripping position engaging the first tubular. In addition, the clamping system comprises a clamp actuator for operating the clamp assembly. The clamp actuator has a central axis and includes a mounting shaft, a first clamp drive gear rotatably coupled to the mounting shaft and a torque drive gear rotatably coupled to the mounting shaft. The first clamp drive gear engages the first cam gear and is configured to rotate the first cam gear and wherein the torque drive gear engages the torque gear and is configured to rotate the torque gear.

These and other needs in the art are addressed in another embodiment by an actuator for operating a clamp assembly. In an embodiment, the actuator comprises a mounting shaft having a central axis, wherein the mounting shaft is rotationally fixed relative to the central axis. In addition, the actuator comprises a first planetary gear set rotatably coupled to the mounting shaft. Further, the actuator comprises a second planetary gear set rotatably coupled to the mounting shaft. Each planetary gear set includes an annular ring gear, a plurality of circumferentially-spaced planet gears radially disposed within the ring gear, and a central sun gear radially disposed within the planet gears. The sun gear of the first planetary gear set is disposed on a first sleeve rotatably mounted to the mounting shaft. The sun gear of the second planetary gear set is fixed to the mounting shaft.

These and other needs in the art are addressed in another embodiment by a clamping assembly for gripping and rotating a tubular. In an embodiment, the clamping assembly comprises a first cam gear configured to rotate about the central axis and having a radially inner surface comprising a plurality of circumferentially adjacent concave recesses defining a plurality of cam surfaces. In addition, the clamping assembly comprises a first plurality of clamp members. Each clamp member of the first plurality of clamp members is disposed in one recess of the first cam gear. Further, the clamping assembly comprises a torque gear configured to rotate about the central axis. Each clamp member is pivotally coupled to the torque gear. Each clamp member is configured to pivot between a withdraw position radially spaced apart from the tubular and a gripping position engaging the first tubular.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the disclosed embodiments of the disclosure, reference will now be made to the accompanying drawings in which.

DETAILED DESCRIPTION OF THE DISCLOSED EMBODIMENTS

Figure 1:
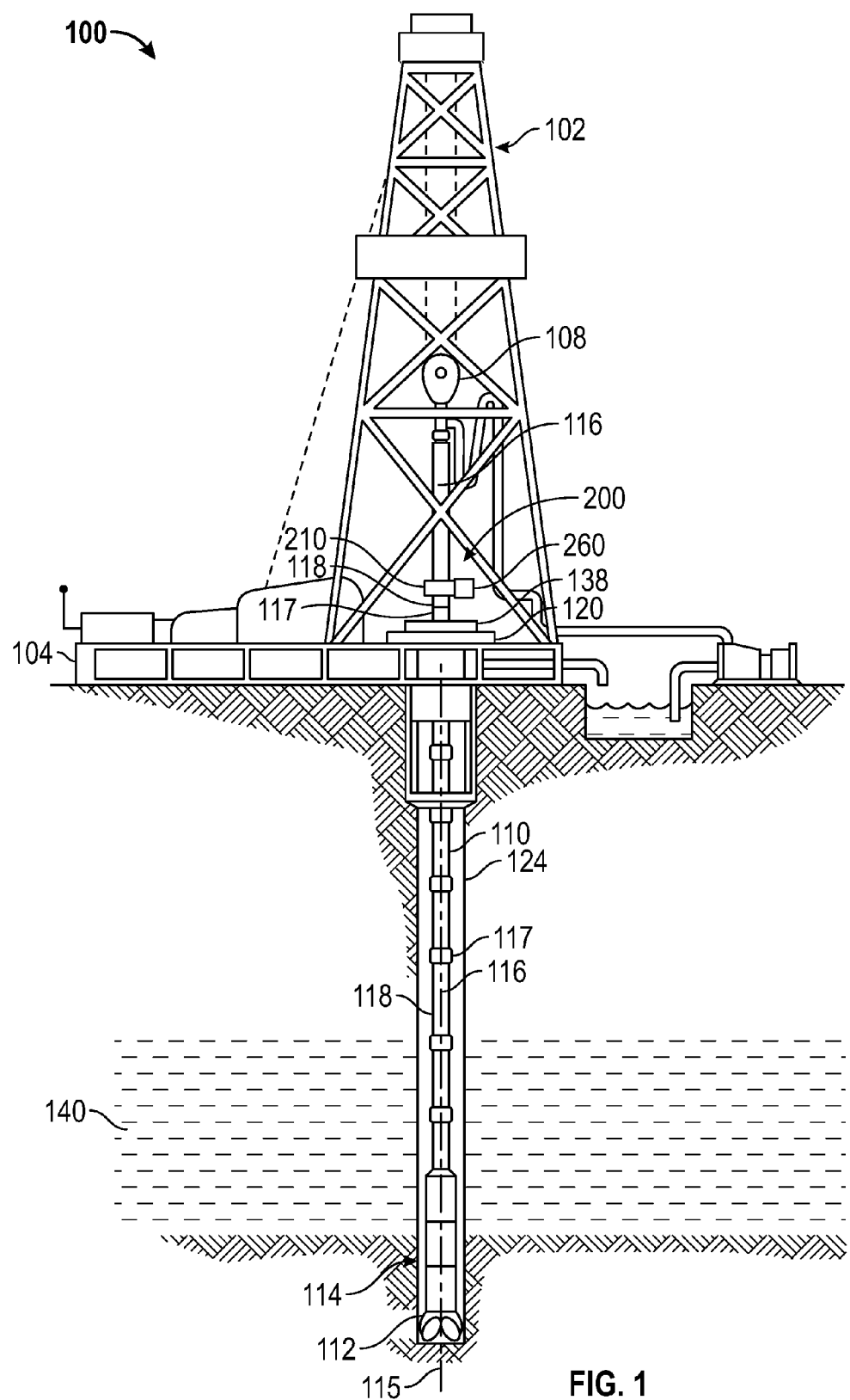
FIG. 1 is a schematic view of a drilling system in accordance with principles described herein.

The following description is exemplary of embodiments of the disclosure. These embodiments are not to be interpreted or otherwise used as limiting the scope of the disclosure, including the claims. One skilled in the art will understand that the following description has broad application, and the discussion of any embodiment is meant only to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components that are identified elsewhere. In addition, like or identical reference numerals may be used to identify common or similar elements.

The terms "including" and "comprising" are used herein, including in the claims, in an open-ended fashion, and thus should be interpreted to mean "including, but not limited to . . . ." Also, the term "couple" or "couples" is intended to mean either an indirect or direct connection. Thus, if a first component couples or is coupled to a second component, the connection between the components may be through a direct engagement of the two components, or through an indirect connection that is accomplished via other intermediate components, devices and/or connections. In addition, as used herein, the terms "axial" and "axially" generally mean along or parallel to a given axis (e.g., central axis of a body or a port), while the terms "radial" and "radially" generally mean perpendicular to the axis. For instance, an axial distance refers to a distance measured along or parallel to the axis, and a radial distance means a distance measured perpendicular to the axis. Any reference to up or down in the description and the claims will be made for purpose of clarification, with "up", "upper", "upwardly" or "upstream" meaning toward the surface of the borehole and with "down", "lower", "downwardly" or "downstream" meaning toward the terminal end of the borehole, regardless of the bore orientation. In some applications of the technology, the orientations of the components with respect to the surroundings may be different. For example, components described as facing "up", in another application, may face to the left, may face down, or may face in another direction.

Referring now to FIG. 1, an embodiment of a drilling system 100 in accordance with the principles described herein is shown. Drilling system 100 includes a derrick 102 supported by a drilling deck or floor 104. Derrick 102 includes a traveling block 108 for raising and lowering a drill string 110. Drilling floor 104 supports a rotary table 120 selectively rotated by a prime mover such as an electric motor. A kelly (not shown) supports the drill string 110 as it is lowered through the rotary table 120.

Drill string 110 has a central or longitudinal axis 115 and includes a plurality of components coupled together end-to-end. For example, in FIG. 1, drill string 110 includes a plurality of drill pipe segments or joints 116 coupled together end-to-end, a bottom hole assembly (BHA) 114 coupled to the lower end of segments 116, and a drill bit 112 coupled to BHA 114. Each pipe segment 116 includes a threaded upper end 117 and a threaded lower end 118. In this embodiment, upper ends 117 are internally threaded box ends and lower ends 118 are externally threaded pin ends.

During drilling operations, drill bit 112 is rotated with weight-on-bit applied to drill a borehole 124 traversing one or more subsurface formations 140. Although the drill string 110 and the drill bit 112 are rotated from the surface with rotary table 120 in this embodiment, in other embodiments, the drill string (e.g., drill string 110) and the drill bit (e.g., bit 112) may alternatively be rotated from the surface by a top drive and/or the drill bit may be rotated with a downhole mud motor disposed in the drill string. During drilling operations drilling fluid or mud 150 is circulated under pressure by a mud system 152 down the drill string 110, out the face of bit 112, and back up the annulus between the drill string 110 and sidewall of borehole 124. As drill bit 112 and drill string 110 penetrate deeper into formation 140, additional pipe segments 116 are periodically added to drill string 110. Similarly, when the drill string is removed from borehole 124, pipe segments 116 are removed and stored.

Referring still to FIG. 1, a drill string support system 138 is positioned in drill floor 106 to support the weight of drill string 110 and prevent the rotation of drill string 110 while adding or removing pipe segments 116. In general, string support system 138 may comprise any system or apparatus known in the art for supporting the weight of a drill string including, without limitation, slips, collars, manual tongs, power tongs or other equipment used in making up or breaking out pipe joints. A clamping system 200 is coaxially aligned with axis 115 and positioned above string support systems 138 to grasp and rotate a pipe segment 116 to be added to or removed from string 110.

Figure 2:
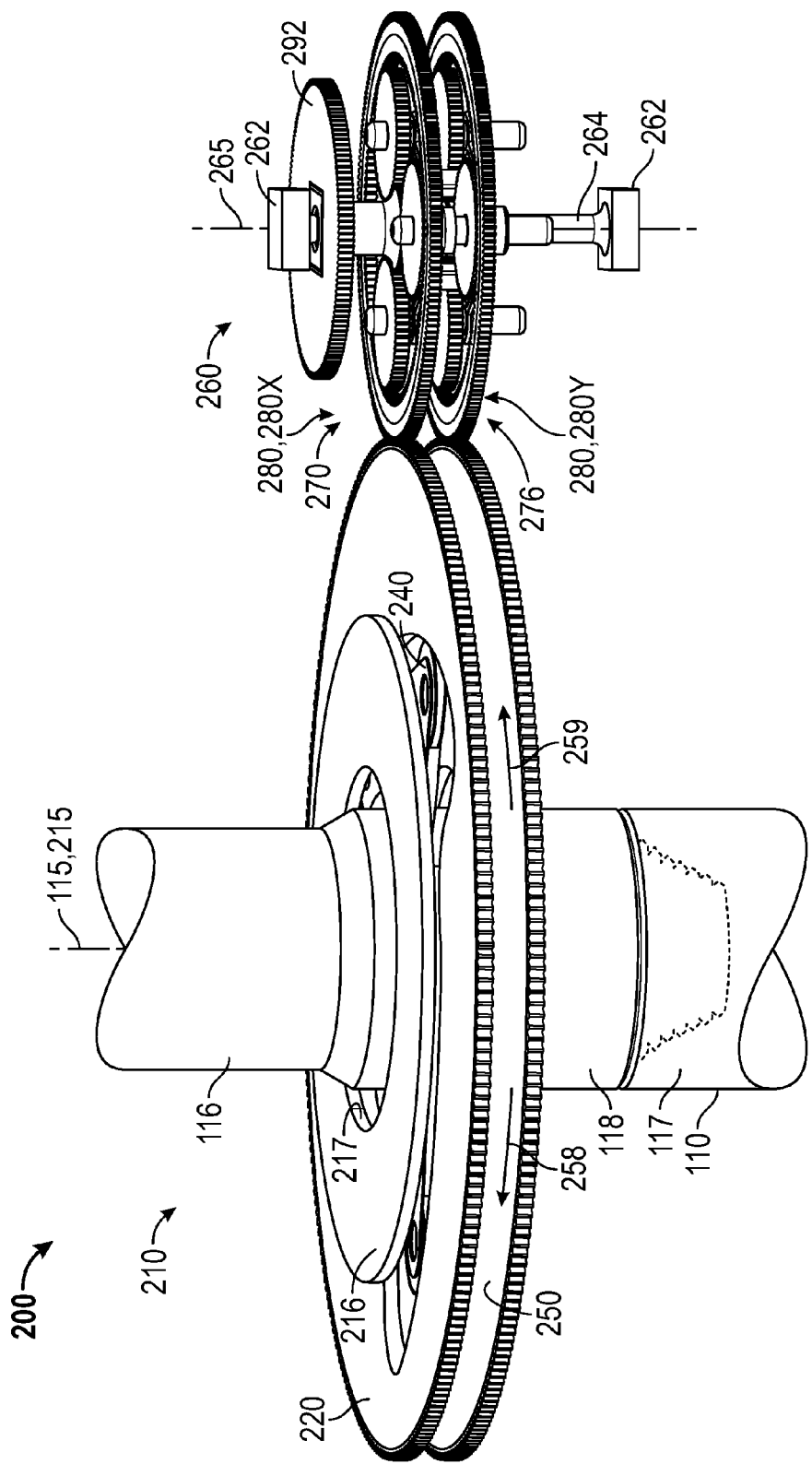
FIG. 2 is a partial perspective view of the clamping system of FIG. 1.
Figure 3:
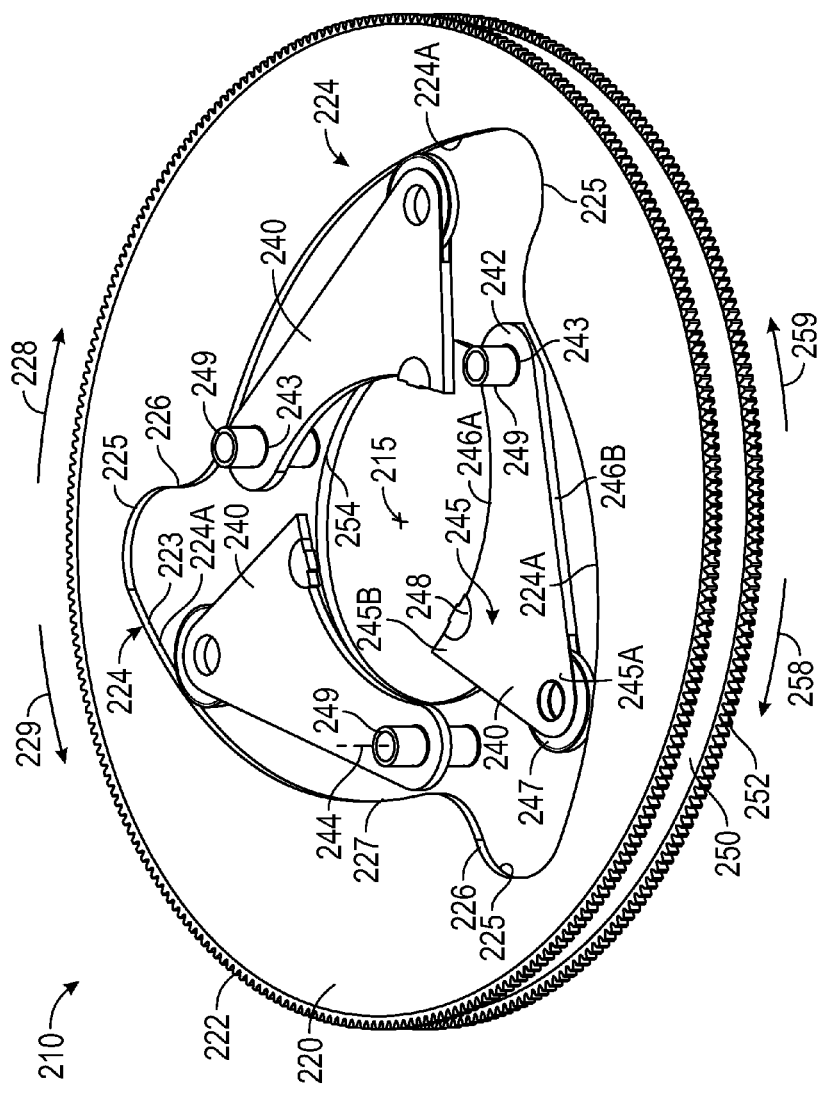
FIG. 3 is a partial perspective view of the clamp assembly of FIG. 2.

Referring now to FIGS. 2 and 3, clamping system 200 includes a clamp assembly 210 and a clamp actuator 260 configured to operate clamp assembly 210. Clamp assembly 210 has a central axis 215, and in this embodiment, includes an annular end plate 216, a generally annular cam gear 220, a plurality of flat, generally triangular clamp members 240 radially disposed within cam gear 220, and an annular torque gear 250. Cam gear 220 is axially disposed between end plate 216 and torque gear 250. Further, end plate 216, cam gear 220, and torque gear 250 are each coaxially aligned with axis 215. As shown in FIG. 2, during pipe segment make and break operations, clamp assembly 210 is coaxially aligned with drill string axis 115 and is disposed about the lower end 118 of a pipe segment 116 above the uphole end of drill string 110. As will be described in more detail below, clamp actuator 260 actuates clamp assembly 210 to grip pipe segment 116 disposed therein with clamp members 240, rotate the pipe segment 116 (in either direction about axes 115, 215), and disengage the pipe segment 116.

End plate 216 and torque gear 250 each have a central through bore or hole that defines a radially inner annular surface 217, 254, respectively. Each inner surface 217, 254 is disposed at a radius that is greater than the outer radius of each component of drill string 110 so as to not interfere with pipe segments 116 or other components moving therethrough. In addition, torque gear 250 has a radially outer surface 252 comprising gear teeth. A plurality of circumferentially-spaced pins or shafts 249 extend vertically between end plate 216 and torque gear 250. The upper end of each pin 249 is fixed to end plate 216, and the lower end of each pin 249 is fixed to torque gear 250. Thus, end plate 216 and torque gear 250 are rigidly coupled together, and thus, do not move translationally or rotationally relative to each other.

As best shown in FIG. 3, cam gear 220 has radially outer surface 222 comprising gear teeth and a radially inner surface 223 comprising as a plurality of circumferentially adjacent generally concave recesses 224. As will be described in more detail below, the discrete segments of inner surface 223 defining recesses 224 function as cam surfaces 224a. The minimum radius of inner surface 223 is greater than the outer radius of the various components of drill string 110 so as to not interfere with pipe segments 116 or other components moving therethrough.

In this embodiment, inner surface 223 comprises three circumferentially adjacent cam surfaces 224a. However, in general, any suitable number of circumferentially adjacent cam surfaces 224a can be employed. Each cam surface 224a is identical. In particular, each cam surface 224a curves or sweeps circumferentially from a first end 226 to a second end 227. First end 226 extends radially outward further than second end 227, and thus, first end 226 may also be referred to as a radially outer end and second end 227 may be also be referred to as a radially inner end. Radially outer end 226 of each cam surface 224a comprises a semi-circular concave pocket 225 that curves radially inward to the radially inner end 227 of the circumferentially adjacent cam surface 224a. Moving circumferentially from the pocket 225 to the radially inner end 227 of a given cam surface 224a, inner surface 223 curves radially inward.

Referring still to FIG. 3, clamp members 240 are oriented co-planar with cam gear 220, and one clamp 240 is generally positioned within each recess 224. Each clamp 240 is identical. In particular, each clamp 240 includes a first or pinned end 242, a second or free end 245, a radially inner concave surface 246A extending between ends 242, 245, and a radially outer surface 246B extending between ends 242, 245. Surfaces 246A, 246B taper towards each other moving from end 242 to end 245. Thus, at end 245, surfaces 246A, 246B are radially spaced apart.

Each clamp 240 includes a through-bore or hole 243 extending vertically through pinned end 242. One pin 249 extends vertically through each hole 243 and slidingly engages the corresponding clamp 240. Thus, each clamp 240 is free to rotate or pivot radially inward and radially outward about the corresponding pin 249 and a vertical pivot axis 244 coaxially aligned with the pin 249 and hole 243. In this embodiment, clamp members 240 are biased radially outward, and as will be described in more detail below, rotation of cam gear 220 relative to clamp members 240 actuates clamp members 240 to pivot about ends 242 radially inward and radially outward relative to axis 215.

Free end 245 of each clamp 240 includes a radially outer corner 245A and a radially inner corner 245B. A bearing wheel 247 is rotatably coupled to outer corner 245A of each clamp 240 and engages the corresponding cam surface 224a. Wheel 247 is configured to rotate about a vertical axis and roll along the corresponding cam surface 224a. As previously described, each clamp 240 is biased radially outward. More specifically, bearing wheels 247 are biased into engagement with the corresponding cam surface 224a. Clamp members 240 may be biased radially outwardly by any suitable means known in the art such as a torsional spring extending between each clamp 240 and the corresponding pin 249. Although a wheel 247 is provided between on each outer corner 245A in this embodiment, in other embodiments, the outer corners (e.g., outer corners 245A) may simply slidingly engage the corresponding cam surface (e.g., cam surface 224a) without any wheel. A fixed gripping element 248 is mounted to inner surface 246A adjacent free end 245. As clamp members 240 pivot about axes 244 radially inward and radially outward, gripping elements 248 engage and disengage the pipe segment 116 extending through clamp assembly 210.

Referring still to FIG. 3, clamp members 240 pivot about ends 242 into and out of engagement with pipe segment 116 by rotating cam gear 220 relative to torque gear 250 and clamp members 240. In particular, rotation of cam gear 220 in a first or clamping direction 228 relative to torque gear 250 causes clamp members 240 to pivot about axes 244 in one direction and move free ends 245 with gripping elements 248 inward toward axis 215; and a rotation of cam gear 220 in a second or unclamping direction 229 relative to torque gear 250 causes clamp members 240 to pivot about axes 244 in the opposite direction and move free ends 245 with gripping elements 248 outward away from axis 215. In particular, as cam gear 220 rotates in clamping direction 228 relative to torque gear 250, wheels 247 roll along cam surfaces 224a towards ends 227. Surfaces 224a generally sweep radially inward moving from pockets 225 to ends 227, and thus, clamp members 240 are cammed inward towards axis 215 as wheels 247 roll towards ends 227. On the other hand, as cam gear 220 rotates in unclamping direction 229 relative to torque gear 250, wheels 247 roll along cam surfaces 224a towards pockets 225. Surfaces 224a generally sweep radially outward moving from ends 227 to pockets 225, and thus, clamp members 240 (biased into engagement with surfaces 224a) pivot outward away from axis 215 as wheels 247 roll towards pockets 225. The rotation of gears 220, 250 is controlled by actuator 260, which as will be described in more detail below, includes toothed gears that matingly engage and intermesh with gears 220, 250. It should be appreciated that the relative rotations of gears 220, 250 can be accomplished by rotating gears 220, 250 about axis 215 in opposite directions, by rotating gears 220, 250 about axis 215 in the same direction at different rotational speeds, or by rotating one gear 220, 250 while holding the other gear 220, 250 static.

Figure 4:
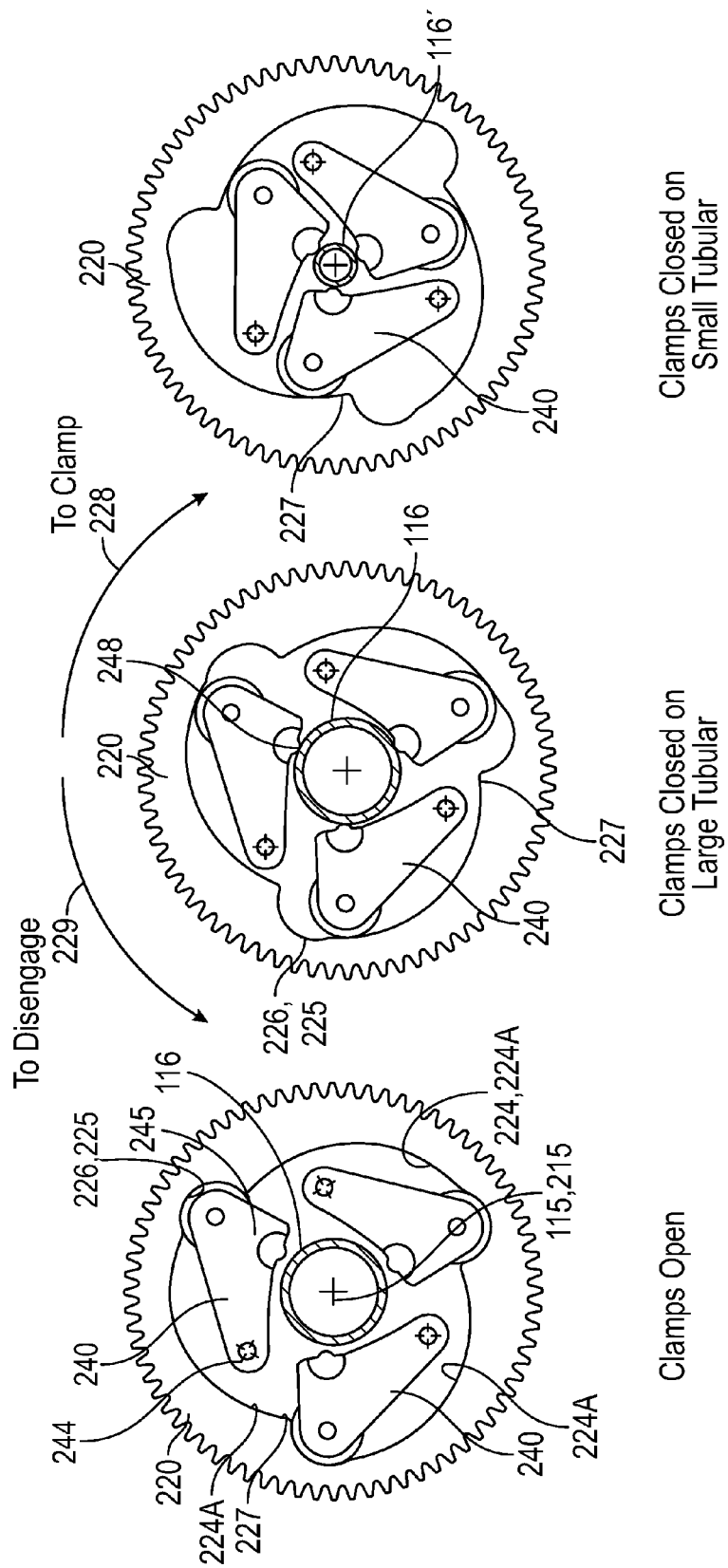
FIGS. 4A and 4B are top views of the clamp members of the clamp assembly of FIG. 2 withdrawn from and gripping, respectively, a tubular member.
FIG. 4C is a top view of the clamp members of the clamp assembly of FIG. 2 gripping a tubular member with a different outer diameter than the tubular member of FIGS. 4A and 4B.

Referring now to FIGS. 4A and 4B, the positions of clamp members 240 with respect to cam surfaces 224a and pipe segment 116 extending therebetween are shown. In particular, FIG. 4A illustrates clamp members 240 in a "withdrawn" position with wheels 247 seated in pockets 225 of the corresponding cam surfaces 224a and gripping elements 248 radially spaced apart from pipe segment 116, and FIG. 4B illustrates clamp members 240 in an "gripping" position with wheels 247 moved out of pockets 225 toward ends 227 and gripping elements 248 radially advanced into engagement with pipe segment 116. Thus, in the withdraw position, each clamp 240 is pivoted about axis 244 away from axis 215 and pipe segment 116, thereby providing sufficient radial clearance between clamp members 240 and pipe segment 116 to allow rotational and axial movement of tubular segment 116 relative to clamp members 240, and in the gripping position, each clamp 240 is pivoted about axis 244 toward axis 215 and into engagement with pipe segment 116, thereby gripping pipe segment 116 and preventing pipe segment 116 from rotating and moving axially relative to clamp members 240. Cam gear 220 is rotated in the clamping direction 228 relative to torque gear 250 to transition from the withdrawn position to the gripping position, and cam gear 220 is rotated in the unclamping direction 229 relative to torque gear 250 to transition from the gripping position to the withdrawn position.

With gripping elements 248 firmly engaging and gripping pipe segment 116, simultaneous rotation of torque gear 250 and cam gear 220 in a first or threading direction 258 (FIGS. 2 and 3), enables rotation of pipe segment 116 in the direction necessary to thread pipe segment 116 to the uphole end drill string 110; and simultaneous rotation of torque gear 250 and cam gear 220 in a second or unthreading direction 259 (FIGS. 2 and 3), enables rotation of pipe segment 116 in the direction necessary to unthread pipe segment 116 from the uphole end drill string 110. During threading and unthreading of pipe segment 116 to the uphole end of drill string 110, drill string 110 is held against axial and rotational movement by string support system 138. Once pipe segment 116 is threaded to or unthreaded from drill string 110, as desired, cam gear 220 is rotated in the unclamping direction 229 relative to torque gear 250 to transition clamp members 240 from the gripping positions to the withdrawn positions to disengage and release pipe segment 116.

In FIGS. 4A and 4B, clamp assembly 210 is shown interacting with (i.e., engaging, rotating, and disengaging) a pipe segment 116 having a certain outer diameter. However, it should be appreciated that clamp assembly 210 can interact with pipe segments 116 having outer diameters greater than and less than the diameter of pipe segment 116 shown in FIGS. 4A and 4B. For example, in FIG. 4C, clamp assembly 210 is shown gripping a pipe segment 116' having an outer diameter that is less than pipe segment 116 shown in FIGS. 4A and 4B.

Referring again to FIG. 2, clamp actuator 260 has a central axis 265 and includes an actuator body or frame 262 (schematically shown), a mounting shaft 264 with ends fixed to body 262, a clamp drive gear 270 rotatably coupled to shaft 264, a torque drive gear 276 rotatably coupled to shaft 264, and a planet carrier 287 (FIG. 5) disposed between clamp drive gear 270 and torque drive gear 276. Shaft 264, clamp drive gear 270, and torque drive gear 276 are coaxially aligned with axis 265. As will be described in more detail below, clamp drive gear 270 is configured to engage and rotate cam gear 220 of clamp assembly 210 about axis 215 in either direction, and torque drive gear 276 is configured to engage and rotate torque gear 250 of clamp assembly 210 about axis 215 in either direction. In this embodiment, actuator body 262 is coupled to drilling floor 106 and is rotationally fixed relative to the drilling floor 105. Thus, body 262 and mounting shaft 264 fixed thereto do not move translationally or rotationally relative to each other or the drilling floor 105.

In this embodiment, each drive gear 270, 276 is a planetary gear set 280, and each planetary gear set 280 has the same gear ratios. As best shown in the exploded view of FIG. 5, each planetary gear set 280 includes an annular ring gear 282, a plurality of circumferentially-spaced planet gears 284 radially disposed within ring gear 282, and a central sun gear 286 radially disposed within planet gears 284. Thus, for a given planetary gear set 280, planet gears 284 are radially positioned between sun gear 286 and ring gear 282. Ring gears 282 and sun gears 286 are coaxially aligned with central axis 265, whereas planet gears 284 are circumferentially-spaced about axis 265. Specifically, each planet gear 284 has a central axis 285 radially spaced from and oriented parallel to central axis 265. In this embodiment, axis 285 of each planet gear 284 in each gear set 280 is coaxially aligned with axis 285 of one planet gear 284 in each of the other gear sets 280. Although this embodiment includes three planet gears 284 in each gear set 280, other embodiments may have more or fewer planet gears (e.g., planet gears 284) within each gear set (e.g., gear set 280).

Ring gear 282, planet gears 284, and sun gear 286 have intermeshing teeth. In particular, ring gear 282 has radially inner teeth 283A and radially outer teeth 283B, planet gears 284 have radially outer teeth 277, and sun gear 286 has radially outer teeth 278. Teeth 283A, 277 matingly engage and intermesh, and teeth 277, 278 matingly engage and intermesh. Outer teeth 283B of ring gear 282 of clamp drive gear 270 matingly engage and mesh with the teeth on outer surface 222 of cam gear 220, and outer teeth 283B of ring gear 282 of torque drive gear 276 matingly engage and mesh with the teeth on outer surface 252 of torque gear 250.

For purposes of clarity and further explanation, planetary gear set 280 of clamp drive gear 270 may also be referred to as the first or upper planetary gear set 280x, and planetary gear set 280 of torque drive gear 276 may also be referred to as the second or lower planetary gear set 280y. Likewise, the subcomponents of planetary gear sets 280x, 280y may be designated as "first" or "second", respectively, or denoted with "x" or "y", respectively. For example, ring gear 282 of first planetary gear set 280x may also be referred to as first ring gear 282 or ring gear 282x, and ring gear 282 of second planetary gear set 280y may also be referred to as second ring gear 282 or ring gear 282y.

Figure 5:
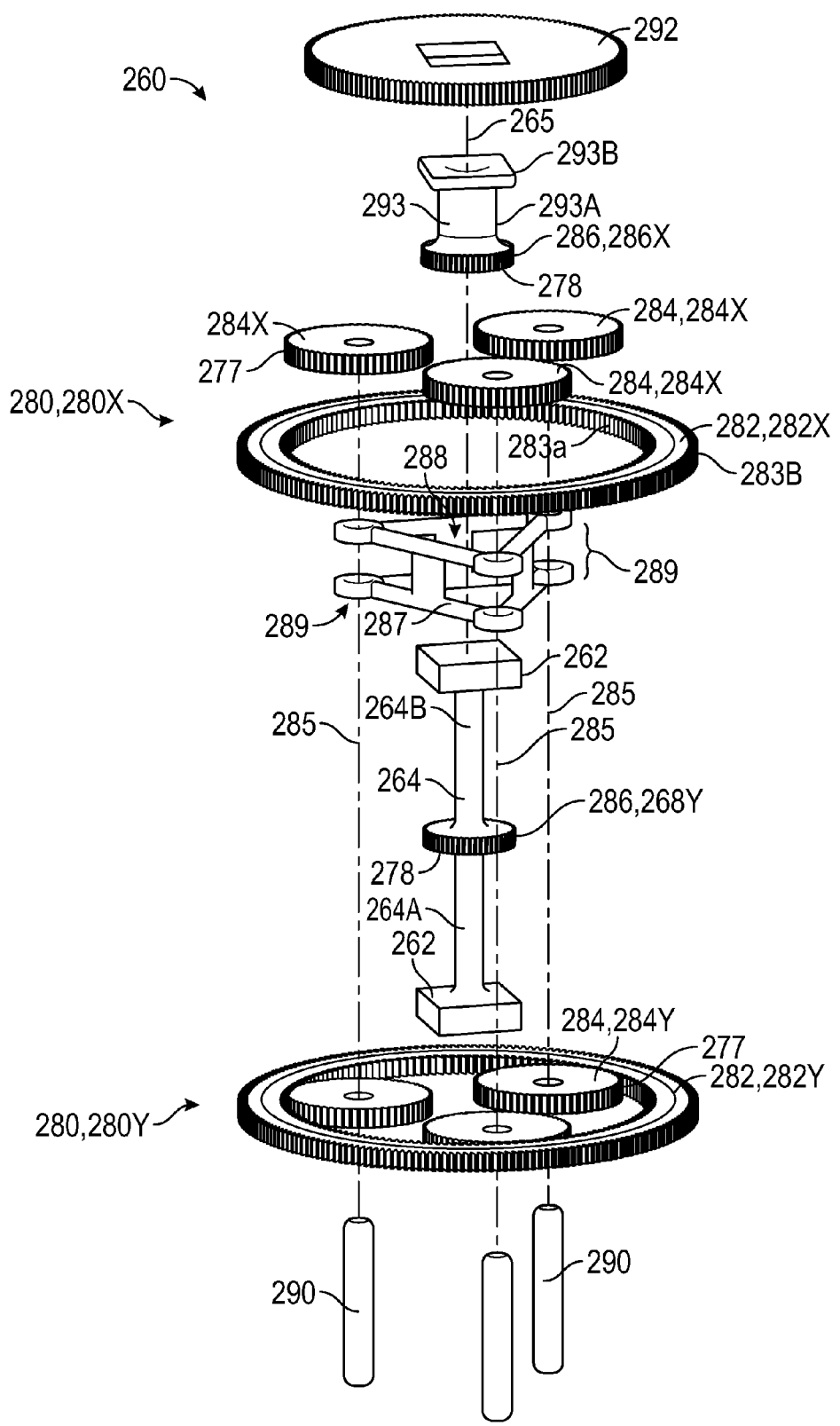
FIG. 5 is an exploded perspective view of the clamp actuator of FIG. 2.

Referring now to FIGS. 2 and 5, planet carrier 287 synchronizes the orbital motion of the planet gears 284x, 284y about axis 265. Thus, planet gears 284x, 284y orbit together in the same direction and rotational speed about axis 265. In this embodiment, carrier 287 includes a central through-passage 288 through which shaft 264 extends, and a plurality of pin guides 289 circumferentially-spaced about axis 265. In this embodiment, each pin guide 289 is formed as two, axially-spaced, concentric holes. Each pin guide 289 is coaxially aligned with one planet gear 284x of upper planetary gear set 280x and one planet gear 284y of lower planetary gear set 280y. An axle or pin 290 oriented parallel to axis 265 is slidably received by each guide 289. One upper planet gear 284*x* is rotatably coupled to the upper end of each pin 290, and one lower planet gear 284*y* is rotatably coupled to the lower end of each pin 290. Thus, the number of guides 289 and the number of pins 290 is the same as the number of upper planet gears 284*x* and the number of lower planet gears 284*y*. Although upper planet gears 284*x* are coaxially aligned with lower planet gears 284*y* in this embodiment, in other embodiments, the upper plant gears (e.g., upper planet gears 284*x*) are not coaxially aligned with the lower planet gears (e.g., lower planet gears 284*y*) but are coupled by a carrier such that they orbit together in the same rotational direction.

Mounting shaft 264 includes a first or lower end 264A rigidly fixed to body 262 and a second or upper end 264B rigidly fixed to body 262. Thus, shaft 264 does not move translationally or rotationally relative to body 262. Lower sun gear 286*y* is disposed along shaft 264 between ends 264A, 264B and is fixed thereto. Thus, lower sun gear 286*y* does not move translationally or rotationally relative to shaft 264 and body 262. In other words, lower sun gear 286*y* does not rotate about axis 265.

Referring still to FIGS. 2 and 5, a transfer gear 292 is coupled to clamp drive gear 270 (i.e. first planetary gear set 280*x*) with a sleeve 293 disposed about shaft 264 proximal upper end 264B. Sleeve 293 slidingly engages shaft 264, and thus, can rotate in either direction about axis 265 relative to shaft 264. Sleeve 293 has a first or lower end 293A comprising sun gear 286*x* and a second or upper end 293B seated in a mating aperture or receptacle in transfer gear 292. The geometry of upper end 293B and the mating receptacle in transfer gear 292 are such that rotational torque can be transferred between transfer gear 292, sleeve 292, and sun gear 286*x*. In other words, transfer gear 292, sleeve 293, and sun gear 286*x* do not rotate relative to each other about axis 265.

Figure 6:
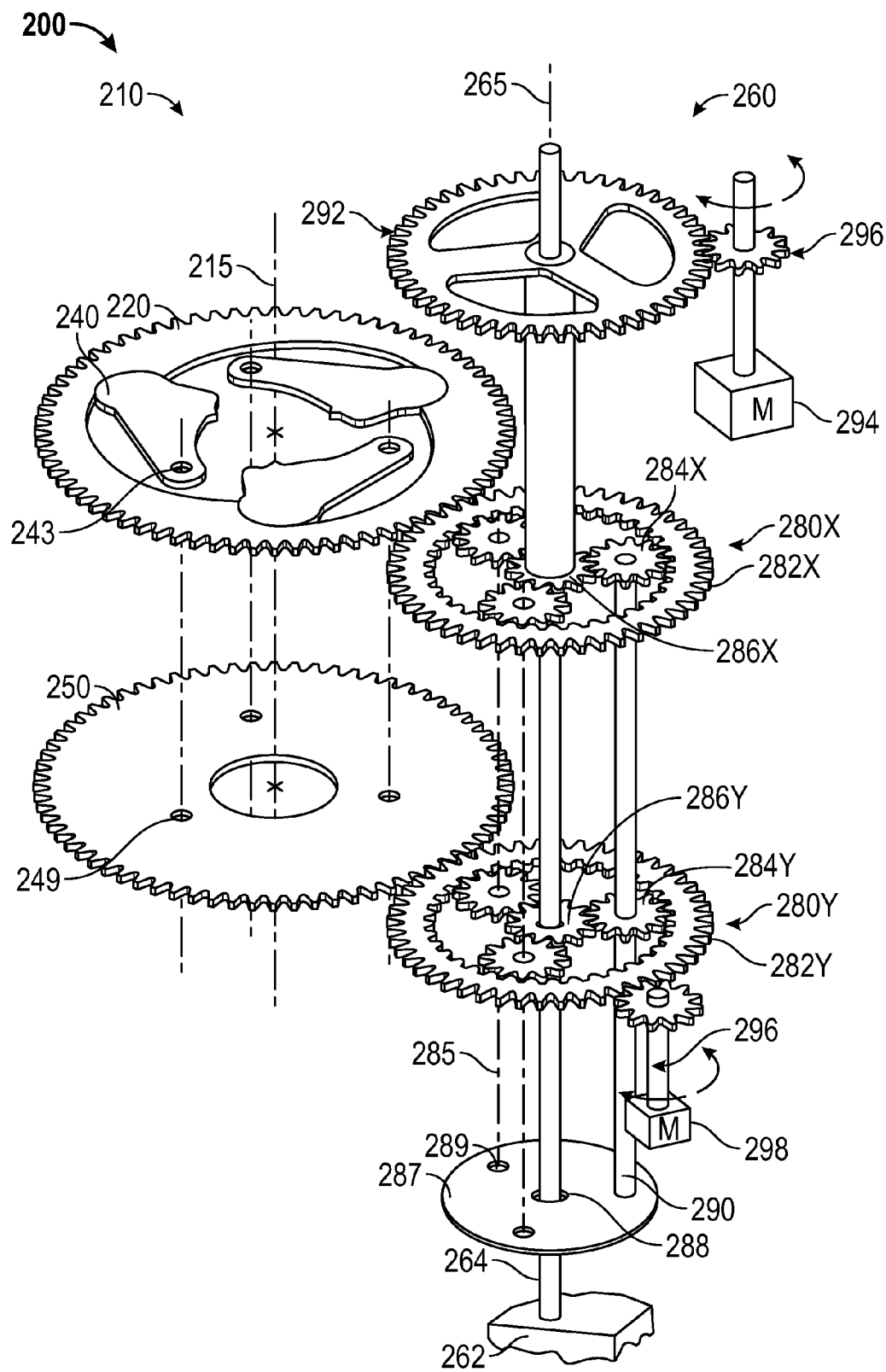
FIG. 6 is an exploded perspective view of the clamping system of FIG. 2.

As best shown in FIG. 6, a clamp drive motor 294 is coupled to transfer gear 292 with a first motor output shaft and gear 296 to selectively rotate transfer gear 292 and sun gear 286*x* about axis 265 or prevent the rotation of transfer gear 292 and sun gear 286*x* about axis 265. In addition, a torque drive motor 298 is coupled to second ring gear 282*y* with a second motor output shaft and gear 296 to selectively rotate ring gear 282*y* about axis 265 or prevent the rotation of ring gear 282*y* about axis 265. In general, each motor 294, 298 can be any type of motor known in the art including, without limitation, an electrical motor, a hydraulically-drive motor, etc. In this embodiment, the rotational direction and speed of each motor 294, 298 are adjustable and independently controlled.

As will be described in more detail below, in this embodiment, torque motor 298 drives the rotation of torque gear 250 via lower planetary gear set 280*y*. However, in other embodiments, the torque drive motor (e.g., motor 298) can be directly coupled to the torque gear (e.g., gear 250) to drive the rotation of the torque gear or directly coupled to the carrier (e.g., carrier 287) to drive the torque drive gear via the lower planetary gear set (e.g., planetary gear set 280*y*).

Referring now to FIGS. 2 and 6, the modes of operation of clamp actuator 260 are governed at least in part by the fact that sun gear 286*y* is rotationally fixed relative to central axis 265 while sun gear 286*x* can be selectively rotated about axis 265. In a first mode of operation, lower ring gear 282*y* is rotationally fixed (i.e., ring gear 282*y* does not rotate about axis 265). Since sun gear 286*y* is also rotationally fixed as previously described, lower planet gears 284*y* cannot rotate about their axes 285 or orbit around axis 265 and carrier 287 is rotationally fixed (i.e., carrier 287 does not rotate about axis 265). Consequently, upper planet gears 284*x* cannot orbit around axis 265. However, upper planet gears 284*x* can rotate about their respective axes 285, and thus, transfer gear 292 and upper sun gear 286*x* can rotate about axis 265 in either direction to rotate ring gear 282*x* about axis 265 either direction. Therefore, upper ring gear 282*x* can be rotated about axis 265 in either direction with lower ring gear 282*y* rotationally fixed. This first mode of operation can be achieved by holding motor output shaft and gear 296 of torque drive motor 298 rotationally fixed and rotating clamp drive motor 294 in a forward or a reverse direction.

In a second mode of operation, upper sun gear 286*x* is rotationally fixed (i.e., upper sun gear 286*x* does not rotate about axis 265). Torque is preferably steadily applied to upper sun gear 286 while it is rotationally fixed. However, upper planet gears 284*x* are generally free to rotate about their axes 285 and orbit about axis 265, and upper ring gear 282*x* is generally free to rotate about axis 265. With upper sun gear 286*x* fixed, if lower ring gear 282*y* is rotationally fixed, then upper planet gears 284*x* and upper ring gear 282*x* will also be fixed as previously described. However, if lower ring gear 282*y* is rotated in either direction with torque drive motor 298, lower planet gears 284*y* rotate about their respective axes 285, and since lower sun gear 286*y* is rotationally fixed, rotation of lower planet gears 284*y* causes lower planet gears 284*y* to orbit about central axis 265, thereby causing carrier 287 to rotate about axis 265 and upper planet gears 284*x* to orbit about axis 265. Since sun gear 286*x* is rotationally fixed in this mode, the orbiting planet gears 284*x* rotate about their axes 285 as they orbit axis 265, thereby inducing the rotation of upper ring gear 282*x*. Because planetary gear sets 280*x*, 280*y* have the same gear ratios, the direction and speed of rotation of upper ring gear 282*x* is the same as the direction and speed of rotation of lower ring gear 282*y*. Therefore, upper ring gear 282*x* and lower ring gear 282*y* can be rotated about axis 265 together in either direction with upper sung gear 286*x* rotationally fixed. With ring gears 282*x*, 282*y* rotating together in the same direction and at the same rotational speed about axis 265, clamp elements 240 and gripping elements 248 remain in a radially fixed position with respect to axis 215 and pipe segment 116.

This second mode of operation can be achieved by holding motor output shaft and gear 296 of clamp drive motor 294 rotationally fixed and rotating torque drive motor 298 in a forward or a reverse direction. Thus, holding motor output shaft and gear 296 of motor 294 rotationally fixed, ring gears 282*x*, 282*y* do not rotate relative to each other, and thus, gears 220, 250 do not rotate relative to each other. If clamping elements 240 are grasping pipe segment 116, they will maintain an active grasp on pipe segment 116 (since gears 220, 250 cannot rotate relative to each other) while selectively rotating pipe segment 116 in a threading direction 258 or an unthreading direction 259. For example, clamp drive motor 294 can be actively held in a non-rotational state (e.g., "stalling the motor" or using an electric brake) to maintain the active grasp of clamping system 200 on pipe segment 116. When clamp drive motor 294 is actively held in a non-rotational state, motor output shaft and gear 296 continue to apply a torque to the transfer gear 292 and the upper sun gear 286*x* without gears 292, 286*x* rotating. Simultaneously, torque drive motor 298 can transfer torque through lower planetary gear set 280*y*, torque gear 250, and clamp elements 248 grasping pipe segment 116 to rotate pipe segment 116.

In a third mode of operation, upper sun gear 286*x* and lower ring gear 282*y* are rotated simultaneously about central axis 265. Depending on the relative directions of rotation and the rotational speeds of upper sun gear 286x and lower ring gear 282y, upper ring gear 282x can rotate in the direction opposite of lower ring gear 282y, in the same direction but at a different rotational speed as lower ring gear 282y, or remains stationary relative to axis 265. In this mode as in other modes, to the extent upper planet gears 284x and lower planet gears 284y orbit about axis 265, they orbit together due to their coupling by carrier 287 and pins 290. In a fourth mode of operation, upper sun gear 286x and lower ring gear 282y are both rotationally fixed (i.e., neither rotates about axis 265). As a result, upper ring gear 282x and planet gears 284x, 284y are rotationally fixed. This fourth mode of operation corresponds, for example, to a period when both motors 294, 298 are stalled (i.e., holding torque but unable to rotate further), correspond to a period of inactivity, or represents a de-energized state.

Provided clamp members 240 do not restrict the rotation of upper ring gear 282x (e.g., via engagement of clamp members 240 with pipe segment 116 or engagement of clamp members 240 with pockets 225), upper ring gear 282x can be rotated in either direction whether lower ring gear 282y is fixed or rotated in either direction. Thus, rotation of upper ring gear 282x is generally independent of lower ring gear 282y. However, rotation of lower ring gear 282y is not necessarily independent of upper ring gear 282x. For example, if lower ring gear 282y is rotating, upper ring gear 282x will also rotate unless the combination of the rotation of upper sun gear 286x and orbiting of upper planet gears 284x results in upper ring gear 282x remaining effectively stationary.

Clamp drive gear 270, and in particular, upper ring gear 282x controls the selective rotation of cam gear 220 about axis 215 in the clamping direction 228 and the unclamping direction 229, and can selectively prevent the rotation of cam gear 220 about axis 215. Torque drive gear 276, and in particular, lower ring gear 282y controls the selective rotation of torque gear 250 about axis 215 in the threading direction 258 and the unthreading direction 259, and can selectively prevent the rotation of torque gear 250 about axis 215. Thus, clamp actuator 260 is configured to selectively rotate cam gear 220 about axis 215 relative to torque gear 250 to transition clamp members 240 between the withdrawn and gripping positions, and configured to selectively rotate cam gear 220 and torque gear 250 together in the threading or unthreading directions 258, 259 with clamp members 240 in the gripping positions to thread or unthread pipe segment 116 from the uphole end of drill string 110.

Figure 7:
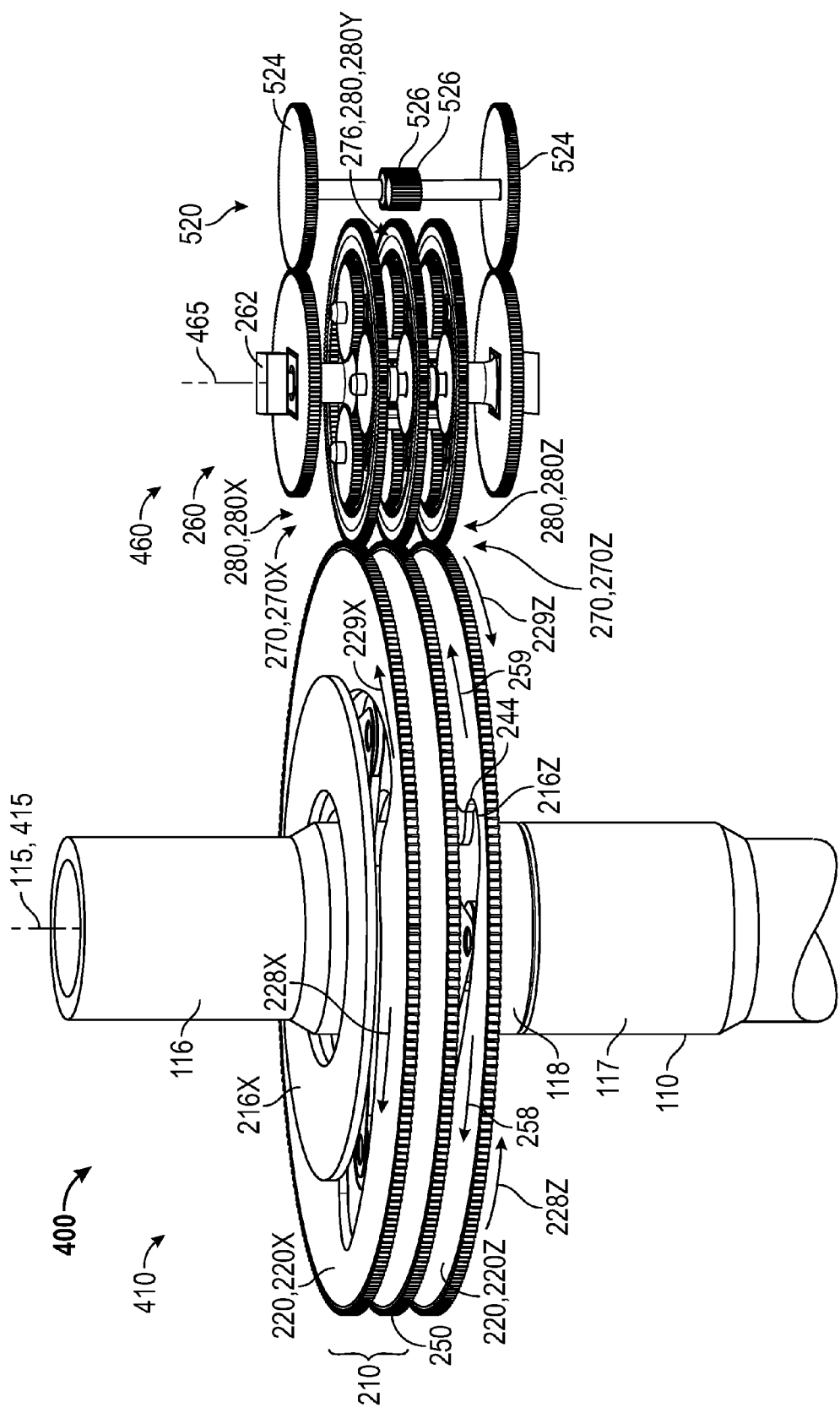
FIG. 7 a partial perspective view of an embodiment of a clamping system for use with the drilling system FIG. 1.

Referring now to FIG. 7, an embodiment of a clamping system 400 that can be used in the place of clamping system 200 in drilling system 100 is shown. In this embodiment, clamping system 400 includes a clamp assembly 410 and a clamp actuator 460 configured to operate clamp assembly 410.

Clamp assembly 410 is similar to clamp assembly 210 previously described. Namely, clamp assembly 410 has a central axis 415 and includes clamp assembly 210 as previously described. However, in this embodiment, clamp assembly 410 also includes an additional cam gear 220, an additional set of clamp members 240 radially disposed within the added cam gear 220, and an additional end plate 216. The additional cam gear 220 and associated clamp elements 240 are positioned axially below clamping assembly 210, and the additional end plate 216 is positioned axially below the additional cam gear 220. Thus, torque gear 250 is axially disposed between the pair of cam gears 220 (i.e., between cam gear 220 of clamping assembly 210 and the additional cam gear 220), and the additional cam gear 220 is axially positioned between the additional end plate 216 and torque gear 250. Each end plate 216, each cam gear 220, and torque gear 250 is coaxially aligned with axis 415.

During pipe segment make and break operations, clamp assembly 410 is coaxially aligned with drill string axis 115 and is disposed about the lower end 118 of a pipe segment 116 above the uphole end of drill string 110. As will be described in more detail below, clamp actuator 460 actuates clamp assembly 410 to grip pipe segment 116 disposed therein with clamp members 240, rotate the pipe segment 116 (in either direction about axes 115, 415), and disengage the pipe segment 116.

For purposes of clarity and further explanation, the cam gear 220 of clamp assembly 210 and associated components may also be described as "first," "upper," or designated with an "x;" and the additional cam gear 220 and associated components may also be described as "second," "lower," or designated with a "z." For example, cam gear 220 of clamping assembly 210 may also be referred to as the first or upper cam gear 220x, the additional cam gear 220 disposed below clamping assembly 210 may also be referred to as the second or lower cam gear 220z. As another example, clamp members 240 of upper cam gear 220x may also be referred to as first or upper clamp members 240x, and the additional clamp members 240 disposed in lower cam gear 220z may also be referred to as second or lower clamp members 240z.

Figure 8:
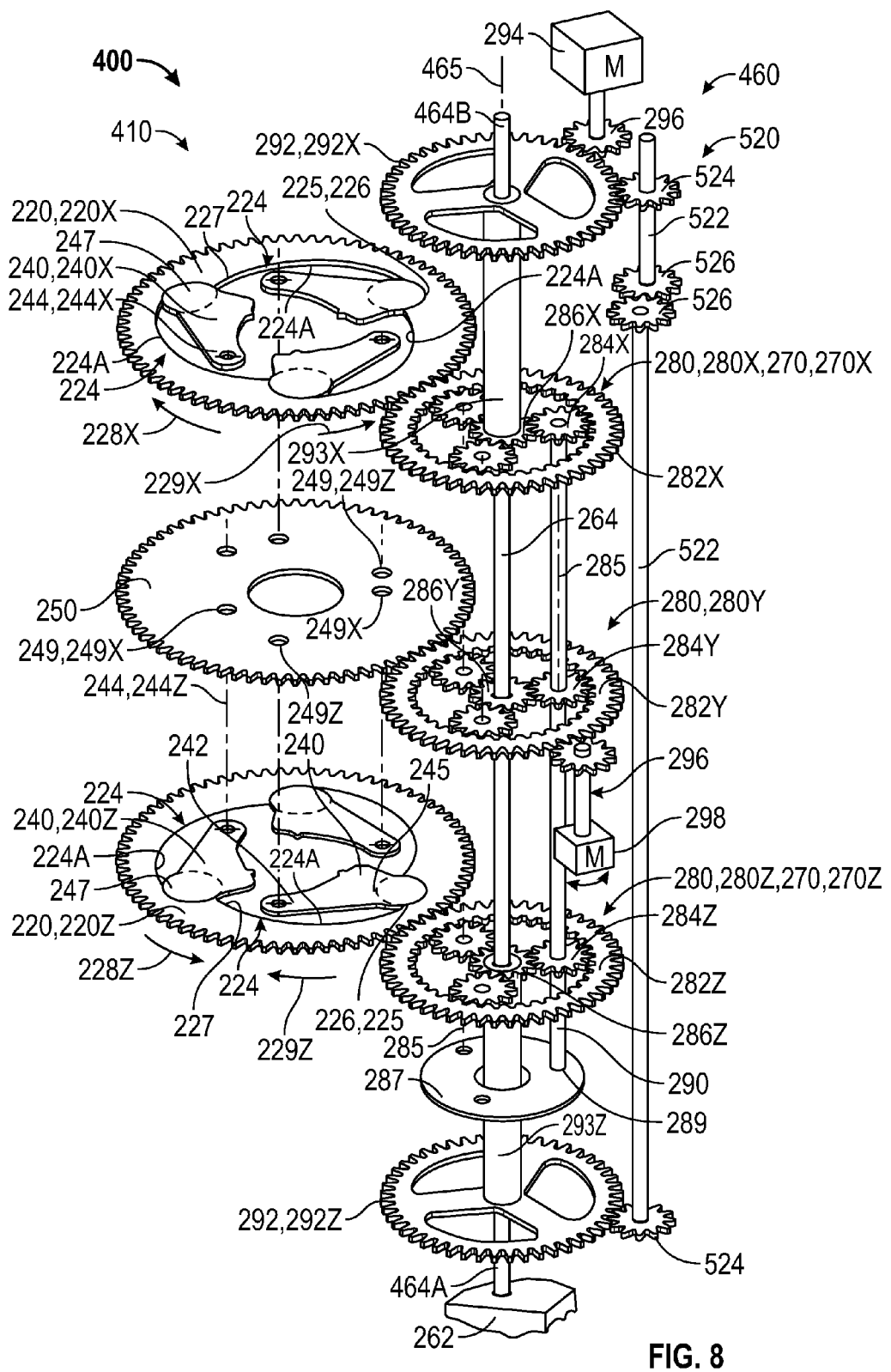
FIG. 8 is an exploded perspective view of the clamping system of FIG. 7.

Referring now to FIG. 8, as previously described with respect to clamping assembly 210, a plurality of circumferentially-spaced pins or shafts 249, also referred to as first or upper pins 249x, extend vertically between upper end plate 216x and torque gear 250. The upper end of each upper pin 249x is fixed to upper end plate 216x, and the lower end of each upper pin 249x is fixed to torque gear 250. Thus, upper end plate 216x and torque gear 250 are rigidly coupled together, and thus, do not move translationally or rotationally relative to each other. In addition, in this embodiment, a second plurality of circumferentially-spaced pins or shafts 249, also referred to as second or lower pins 249z extend vertically between torque gear 250 and lower end plate 216z. The upper end of each lower pin 249z is fixed to torque gear 250 and the lower end of each lower pin 249z is fixed to lower end plate 216z, Thus, lower end plate 216z and torque gear 250 are rigidly coupled together, and thus, do not move translationally or rotationally relative to each other.

Recesses 224 along inner surface 223 of upper cam gear 220x and associated cam surfaces 224a are as previously described, and recesses 224 along inner surface of lower cam gear 220z and associated cam surfaces 224a are as previously described. Thus, each cam surface 224a in upper cam gear 220x and each cam surface 224a in lower cam gear 220z curves or sweeps circumferentially from a first end 226 to a second end 227. First ends 226 extends radially outward further than second ends 227, and each radially outer end 226 comprises a semi-circular concave pocket 225. However, as shown in the perspective of FIG. 8, upper cam gear 220x is oriented such that each cam surface 224a in upper cam gear 220x sweeps in a counter-clockwise direction moving from its first end 226 to its second end 227, whereas lower cam gear 220z is oriented such that each cam surface 224a in lower cam gear 220z sweeps in a clockwise direction moving from its first end 226 to its second end 227. Thus, cam surfaces 224a in upper cam gear 220x and cam surfaces 224a in lower cam gear 220z sweep circumferentially in opposite directions. In other words, in this embodiment, lower cam gear 220z is inverted or flipped relative to upper cam gear 220x.

Clamp members 240 disposed in recesses 224 of upper cam gear 220x and lower cam gear 220z are each as previously described. However, since lower cam gear 220z is inverted with respect to upper cam gear 220x, clamp members 240 in lower cam gear 220z (also referred to as upper clamp members 240x) are inverted relative to clamp members 240 in upper cam gear 220x (also referred to as lower clamp members 240z). Upper clamp members 240x are pivotally coupled to upper pins 249x, and lower clamp members 240z are pivotally coupled to lower pins 249z.

Referring still to FIG. 8, clamp members 240 pivot about ends 242 into and out of engagement with pipe segment 116 by rotating the corresponding cam gear 220z, 220z relative to torque gear 250. As previously described, rotation of cam gear 220x in a first or clamping direction 228x relative to torque gear 250 causes upper clamp members 240x to pivot about axes 244x in one direction to move free ends 245 with gripping elements 248 inward toward axis 415; and rotation of upper cam gear 220x in a second or unclamping direction 229x relative to torque gear 250 causes upper clamp members 240x to pivot about axes 244x in the opposite direction and move free ends 245 with gripping elements 248 outward away from axis 415. Similarly, rotation of lower cam gear 220z in a first or clamping direction 228z relative to torque gear 250 causes lower clamp members 240z to pivot about axes 244z in one direction to move free ends 245 with gripping elements 248 inward toward axis 415; and rotation of lower cam gear 220x in a second or unclamping direction 229z relative to torque gear 250 causes lower clamp members 240z to pivot about axes 244z in the opposite direction and move free ends 245 with gripping elements 248 outward away from axis 415. However, since lower cam gear 220z and associated clamp members 240x are inverted relative to upper cam gear 220x and associated clamp members 240z, clamping direction 228z is opposite clamping direction 228x, and unclamping direction 229z is opposite unclamping direction 229x. For example, in FIG. 7 clamping direction 228x is clockwise and clamping direction 228z is counter-clockwise, and unclamping direction 229x is counter-clockwise and unclamping direction 229z. Thus, by rotating upper cam gear 220x relative to torque gear 250 in the clamping direction 228x, upper clamp members 240x can be transitioned from withdrawn positions to gripping positions; by rotating upper cam gear 220x relative to torque gear 250 in the unclamping direction 229x, upper clamp members 240x can be transitioned from gripping positions to withdrawn positions; by rotating lower cam gear 220z relative to torque gear 250 in the clamping direction 228z, lower clamp members 240z can be transitioned from withdrawn positions to gripping positions; and by rotating lower cam gear 220z relative to torque gear 250 in the unclamping direction 229z, lower clamp members 240z can be transitioned from gripping positions to withdrawn positions.

As assembled within clamping system 400, the rotation of gears 220x, 220z, 250 is controlled by actuator 460, which as will be described in more detail below, includes toothed gears that matingly engage and intermesh with gears 220x, 220z, 250. It should be appreciated that the relative rotations of gears 220x, 220z, 250 can be accomplished (a) by rotating gears 220x, 220z about axis 415 in opposite directions while holding torque gear 250 stationary, (b) by rotating gears 220x, 220z about axis 415 in opposite directions while rotating torque gear 250 at a different rotational speed (the rotational direction of gear 250 will match the direction of one of the cam gears 220x, 220z), or (c) by rotating torque gear 250 while holding the cam gears 220 static.

With gripping elements 248 of upper clamp members 240x and lower clamp members 240z firmly engaging and gripping pipe segment 116, simultaneous rotation of torque gear 250 and cam gears 220x, 220z in a first or threading direction 258 (FIG. 7), enables rotation of pipe segment 116 in the direction necessary to thread pipe segment 116 to the uphole end drill string 110; and simultaneous rotation of torque gear 250 and cam gears 220x, 220z in a second or unthreading direction 259 (FIG. 7), enables rotation of pipe segment 116 in the direction necessary to unthread pipe segment 116 from the uphole end drill string 110. During threading and unthreading of pipe segment 116 to the uphole end of drill string 110, drill string 110 is held against axial and rotational movement by string support system 138. Once pipe segment 116 is threaded to or unthreaded from drill string 110, as desired, cam gears 220x, 220z are rotated in the unclamping directions 229x, 229z, respectively, relative to torque gear 250 to transition clamp members 240x, 240z from the gripping positions to the withdrawn positions to disengage and release pipe segment 116.

Clamp assembly 410 has been described as interacting with (i.e., engaging, rotating, and disengaging) a pipe segment 116 having a particular, but unspecified, outer diameter. However, it should be appreciated that clamp assembly 410 can interact with pipe segments 116 having outer diameters greater than and less than the diameter of pipe segment 116. For example, clamp assembly 410, like clamp assembly 210 shown in FIG. 4C, may grip a pipe segment 116' having an outer diameter that is less than pipe segment 116 shown in FIGS. 4A and 4B.

Referring again to FIG. 7, clamp actuator 460 is similar to clamp actuator 260 previously described. Namely, clamp actuator 460 has a central axis 465 and includes clamp actuator 260 as previously described. However, in this embodiment, clamp actuator 460 also includes an additional clamp drive gear 270 disposed about mounting shaft 264, an additional transfer gear 292 disposed about mounting shaft 264, and a transmission gear train 520 coupled to each clamp drive gear 270. As will be described in more detail below, transmission gear train 520 transfers torque and synchronizes rotational motion between clamp drive gears 270. The additional clamp drive gear 270 is positioned axially below clamp actuator 260, and the additional transfer gear 292 is positioned axially below the additional clamp drive gear 270. Thus, torque drive gear 276 is axially disposed between the pair of clamp drive gears 270 (i.e., between clamp drive gear 270 of clamp actuator 260 and the additional clamp drive gear 270), and the additional clamp drive gear 270 is axially positioned between the additional transfer gear 292 and clamp actuator 260. Each drive gear 270 and transfer gear 292 is coaxially aligned with axis 465. As will be described in more detail below, clamp drive gears 270 are configured to engage and rotate cam gears 220 of clamp assembly 410 about axis 415 in either direction, and torque drive gear 276 is configured to engage and rotate torque gear 250 of clamp assembly 410 about axis 415 in either direction. As previously described, actuator body 262 is coupled to drilling floor 106 and is rotationally fixed relative to the drilling floor 105. Thus, body 262 and mounting shaft 264 fixed thereto do not move translationally or rotationally relative to each other or the drilling floor 105.

Mounting shaft 264, clamp drive gears 270, torque drive gear 276, and transfer gears 292 are each as previously described. Thus, in this embodiment, each drive gear 270, 276 is a planetary gear set 280 as previously described. Ring gears 282 and sun gears 286 of planetary gear sets 280 are coaxially aligned with central axis 465, whereas planet gears 284 of planetary gear sets 280 are radially spaced from axis 465 and circumferentially-spaced about axis 465. Axis 285 of each planet gear 284 in each planetary gear set 280 is coaxially aligned with axis 285 of one planet gear 284 in each of the other planetary gear sets 280.

For purposes of clarity and further explanation, clamp drive gear 270 of clamp actuator 260 and associated components may also be described as "first," "upper," or designated with an "x;" and the additional clamp drive gear 270 and associated components may also be described as "second," "lower," or designated with a "z." For example, clamp drive gear 270 of clamp actuator 260 may also be referred to as the first or upper clamp drive gear 270x, the additional clamp drive gear 270 disposed below clamp actuator 260 may also be referred to as the second or lower clamp drive gear 270z.

In addition, transfer gear 292 and associated sleeve 293 of clamp actuator 260 may also be described as the "first," "upper," or designated with an "x," and the additional transfer gear 292 and associated sleeve 293 may also be described as the "second," "lower," or designated with a "z." Further, planetary gear set 280 and associated components of upper clamp drive gear 270x may also be described as "first," "upper," or designated with an "x;" planetary gear set 280 and associated components of second clamp drive gear 270z may also be described as "second," "lower," or designated with a "z;" and planetary gear set 280 and associated components of torque drive gear 276 may also be described as "third," "central," or designated with an "y."

In this embodiment, outer teeth 283B of upper ring gear 282x matingly engage and mesh with the teeth on outer surface 222 of upper cam gear 220x, and outer teeth 283B of central ring gear 282y of central ring gear 282y matingly engage and mesh with the teeth on outer surface 252 of torque gear 250. Also in this embodiment, outer teeth 283B of lower ring gear 282z of lower ring gear 282z matingly engage and mesh with the teeth on outer surface 222 of lower cam gear 220z.

Referring now to FIG. 8, a planet carrier 287 as previously described synchronizes the orbital motion of the planet gears 284x, 284y, 284z about axis 465. Thus, planet gears 284x, 284y, 284z orbit together in the same direction and rotational speed about axis 465. In this embodiment, carrier 287 is axially positioned between lower planetary gear set 280z and central planetary gear set 280y. An axle or pin 290 oriented parallel to axis 465 is slidably received by each guide 289 in carrier 287. One upper planet gear 284x is rotatably coupled to the upper end of each pin 290, one lower planet gear 284z is rotatably coupled to the lower end of each pin 290, and one planet gear 284y is rotatably coupled to each pin 290 between its upper and lower ends. Thus, the number of guides 289 and the number of pins 290 is the same as the number of upper planet gears 284x, the number of planet gears 284y, and the number of lower planet gears 284z.

As previously described, mounting shaft 264 is rigidly fixed to body 262 at shaft ends 264A, 264B. Thus, shaft 264 does not move translationally or rotationally relative to body 262. In addition, sun gear 286y is fixed to mounting shaft 264 between ends 264A, 264B, and thus, sun gear 286y does not move translationally or rotationally relative to body 262 and does not rotate about axis 465. In other words, sun gear 286y does not rotate about axis 465.

Referring again to FIG. 7, upper transfer gear 292x is coupled to upper clamp drive gear 270x (i.e. the first planetary gear set 280x) with upper sleeve 293x disposed about shaft 264 proximal upper end 264B, and lower transfer gear 292z is coupled to lower clamp drive gear 270z (i.e., the lower planetary gear set 280z) with lower sleeve 293z disposed about shaft 264 proximal lower end 264A. Sleeve 293x, 293z slidingly engage shaft 264, and thus, can rotate in either direction about axis 465 relative to shaft 264. Upper sun gear 286x is disposed at the lower end of upper sleeve 293x, and lower sub gear 286z is disposed at the upper end of lower sleeve 293z. Sleeves 293x, 293z, transfer gears 292x, 292z, respectively, and sun gears 286x, 286z are coupled such that torque can be transferred therebetween in either direction.

In this embodiment, transmission gear train 520 includes a pair of extension shafts 522, each shaft 522 including a first or inner gear 526 disposed at one end and second or outer gear 524 disposed at the opposite end. Extension shafts 522 are parallel to and radially displaced from each other and are parallel to and radially displaced from clamp actuator axis 465. The pair of inner gears 526 matingly engage and mesh, thereby allowing the transfer of rotational torque between shafts 522. This arrangement also results in shafts 522 rotating at the same speed but in opposite directions.

Outer gear 524 of one shaft 522 matingly engages and meshes with upper transfer gear 292x, and outer gear 524 of the other shaft 522 matingly engages and meshes with lower transfer gear 292z. Since shafts 522 rotate simultaneously at the same rotational speed but in opposite directions, transfer gears 292x, 292z will rotate simultaneously at the same rotational speed and in opposite directions and sun gears 286x, 286z will rotate simultaneously at the same rotational speed and in opposite directions. Thus, transmission gear train 520 transfers torque and synchronize rotational motion between sun gears 286x, 286z and planetary gear sets 280x, 280z.

As best shown in FIG. 8, clamp drive motor 294 and first a motor output shaft and gear 296 previously described is coupled to upper transfer gear 292x, which in turn, is coupled to lower transfer gear 292z with transmission gear train 520. Thus, clamp drive motor 294 selectively rotates transfer gears 292x, 292z and sun gears 286x, 282z about axis 465 and prevents rotation of transfer gears 292x, 292z and sun gears 286x, 282z about axis 465. In addition, torque drive motor 298 and second motor output shaft and gear 296 previously described is coupled to central ring gear 282y to selectively rotate ring gear 282y about axis 465 and prevent ring gear 282y from rotating about axis 465. Motors 294, 298 are configured to rotate selectively in a forward and a reverse direction and are independently controlled.

Referring now to FIGS. 7 and 8, the modes of operation of clamp actuator 460 are governed at least in part by the fact that central sun gear 286y is rotationally fixed relative to central axis 465 while upper and lower sun gears 286x, 286z can be selectively rotated about axis 465. In a first mode of operation, central ring gear 282y is rotationally fixed (i.e., ring gear 282y does not rotate about axis 465). Since central sun gear 286y is also rotationally fixed, central planet gears 284y cannot rotate about their axes 285 or orbit around axis 465, and thus, carrier 287 is rotationally fixed (i.e., carrier 287 does not rotate about axis 465). Consequently, in the first mode, upper and lower planet gears 284x, 284z cannot orbit around axis 465. However, upper and lower planet gears 284x, 284z can rotate about their respective axes 285, and thus, transfer gears 292x, 292z and sun gears 286x, 286z, respectively, can rotate about axis 465 in either direction to rotate ring gears 282x, 282z, respectively, about axis 465 in either direction. Therefore, central ring gear 282y can be stationary while upper ring gear 282x is rotated about axis 465 in either direction and lower ring gear 282z is rotated about axis 465 in the opposite direction of upper ring gear 282x. This first mode of operation can be achieved by holding motor output shaft and gear 296 of torque drive motor 298 rotationally fixed and rotating clamp drive motor 294 in a forward or a reverse direction.

In a second mode of operation, upper and lower sun gears 286x, 286z remain fixed and central ring gear 282y is rotated in either direction. Torque is preferably steadily applied to upper sun gears 286x, 286y while they are rotationally fixed. Rotation of ring gear 282y causes central planet gears 284y to rotate about their respective axes 285, and since central sun gear 286y is fixed, the rotation of central planet gears 284y causes central planet gears 284y to orbit about central axis 465 along with carrier 287. Rotation of carrier 287 about axis 465 causes upper and lower planet gears 284x, 284z to orbit about axis 465. Since sun gears 286x, 286z are rotationally fixed in this mode, the orbiting planet gears 284x, 284z rotate about their axes 285 as they orbit, thereby inducing the rotation of upper and lower ring gears 282x, 282z. Because planetary gear sets 280x, 280y, 280z have the same gear ratios, the direction and speed of rotation of ring gears 282x, 282z match the rotation of second ring gear 282y. Thus, ring gears 282x, 282y, 282z rotate together in the same direction and at the same rotational speed about axis 465. This second mode of operation can be achieved by holding motor output shaft and gear 296 of clamp drive motor 294 rotationally fixed and rotating torque drive motor 298 in a forward or a reverse direction. Gear train 520 is held rotationally fixed by transfer gear 292 and motor output shaft and gear 296. For example, clamp drive motor 294 can be actively held in a non-rotational state (e.g., "stalling the motor" or using an electric brake) to maintain the active grasp of clamping system 200 on pipe segment 116. When clamp drive motor 294 is actively held in a non-rotational state, motor output shaft and gear 296 continue to apply a torque to the transfer gear 292 and sun gears 286x, 286z without gears 292, 286x, 286z rotating. Simultaneously, torque drive motor 298 may transfer torque and possibly rotation to pipe segment 116 as a result of the grasp of clamping system 200 and, particularly, the grasp of clamping elements 240.

In a third mode of operation, upper sun gear 286x and central ring gear 282y are rotated simultaneously about central axis 465. Depending on the relative directions of rotation and the rotational speeds of upper sun gear 286x and central ring gear 282y, upper ring gear 282x may rotate in the direction opposite of central ring gear 282y, in the same direction but at a different rotational speed as central ring gear 282y, or remain rotationally fixed relative to axis 465. Lower sun gear 286z rotates at the same speed as upper sun gear 286x but in the opposite direction via gear train 520. In this mode as in other modes, to the extent planet gears 284x, 284y, 284z orbit about axis 465, they orbit together due to their coupling by carrier 287 and pins 290. The rotation of each ring gear 282x, 282y, 282z about axis 465 results, at least in part, from the motions of their respective sun gears 286x, 286y, 286z and their respective planet gears 284x, 284y, 284z as well as the interconnections (i.e. couplings) developed by carrier 287 or gear train 520.

In a fourth mode of operation, upper sun gears 286x, 286z and central ring gear 282y remain stationary (i.e., they do not rotate about axis 465). Therefore, ring gears 282x, 282z and planet gears 284x, 284y, 284z also remain stationary.

Provided clamp members 240 do not restrict the rotation of upper ring gear 282x, 282z (e.g., via engagement of clamp members 240 with pipe segment 116 or engagement of clamp members 240 with pockets 225), ring gears 282x, 282z can be rotated in either direction whether central ring gear 282y is fixed or rotated in either direction. Thus, rotation of upper ring gears 282x, 282z is generally independent of central ring gear 282y. However, rotation of central ring gear 282y is not necessarily independent of ring gears 282x, 282z. For example, if central ring gear 282y is rotating, ring gears 282x, 282z will also rotate unless the combination of the rotation of sun gears 286x, 286z and orbiting of planet gears 284x, 284z results in ring gears 282x, 282z remaining effectively stationary.

Upper clamp drive gear 270x, and in particular, upper ring gear 282x controls the selective rotation of upper cam gear 220x about axis 415. Torque drive gear 276, and in particular, central ring gear 282y controls the selective rotation of torque gear 250 about axis 415. Lower clamp drive gear 270z, and in particular, lower ring gear 282z controls the selective rotation of lower cam gear 220z about axis 415. Thus, clamp actuator 460 is configured to selectively rotate cam gears 220x, 220z about axis 415 relative to torque gear 250 to transition clamp members 240x, 240z, respectively, between the withdrawn and gripping positions, and configured to selectively rotate cam gears 220x, 200z and torque gear 250 together in the threading or unthreading directions 258, 259 with at least clamp members 240x or clamp members 240z in the gripping positions to thread or unthread pipe segment 116 from the uphole end of drill string 110.

For the various embodiments described in the herein, the gears, such as gears 220, 250, 270, 276, 292, 296 for example, have been depicted in the figures as spur gears, having teeth that extend parallel to each gear's axis of rotation. However, various other embodiments use one or more other types of gears, such as helical gears, bevel gears, or any other suitable type of gear or teeth design compatible with the principles disclosed herein. Still other embodiments use spur gears along with one or more other types of gears. In still other embodiments, torque is transferred between one or more components by one or more chains coupled to sprockets. For example, the outer surface 222 cam gear 220 and the outer teeth 293B of ring gear 282 may include sprocket teeth rather than gear teeth, and a chain (not shown) may couple gears 220, 282 instead of being coupled by direct contact of their teeth.

Although described terms of vertical orientations, clamping system 200 is also capable of installation and operation in other orientations, such as horizontal. When axis 215 is horizontal, clamping system 200 may grasp and rotate a horizontal pipe segment 116 to threadingly couple segment 116 to another pipe segment 116 or to a series of assembled tubulars, including a drill string 110, which would also be horizontal for this mode of operation. Additional support against gravity may be used. A axial force may be applied to engage the threads of the threads of the two tubular members being joined. In this scenario and in any of the operation scenarios of clamping system 200, 400, any pipe segment 116 or drill string 110 may be replaced by another suitable or compatible tubular member.

In embodiments described herein, clamp actuators 260, 460 are shown and described in connection with clamp assemblies 210, 410. However, in general, embodiments of clamp assemblies 210, 410 can be actuated by other devices or actuators, and embodiments of clamp actuators 260, 460 can be employed to actuate other clamps or chucks such as the type of chuck used on an electric drill or a drill press. In addition, embodiments of clamping system 200, 400, clamp assemblies 210, 410, and clamp actuators 260, 460 can be used in applications outside of the oil and gas industry including, without limitation, drill presses, milling machines, lathes, robots, and various other rotating connections that require grasping and releasing equipment or material.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A clamping system for making and breaking threaded connections between a first tubular and a second tubular, the system comprising:
   a clamp assembly for gripping and rotating the first tubular relative to the second tubular, the clamp assembly having a central axis and including a first cam gear, a first plurality of clamp members disposed within the first cam gear, and a torque gear;
   wherein the first cam gear has a radially inner surface comprising a plurality of circumferentially adjacent concave recesses defining a plurality of circumferentially adjacent cam surfaces, wherein one clamp member of the first plurality of clamp members is disposed in each recess of the first cam gear;
   wherein each clamp member is pivotally coupled to the torque gear;
   wherein each clamp member is configured to pivot between a withdraw position radially spaced apart from the first tubular and a gripping position engaging the first tubular;
   a clamp actuator for operating the clamp assembly, the clamp actuator having a central axis and including a mounting shaft, a first clamp drive gear rotatably coupled to the mounting shaft and a torque drive gear rotatably coupled to the mounting shaft;
   wherein the first clamp drive gear engages the first cam gear and is configured to rotate the first cam gear and wherein the torque drive gear engages the torque gear and is configured to rotate the torque gear.

2. The clamping system of claim 1, wherein the rotation of the first cam gear relative to the torque gear about the central axis of the clamp assembly in a first direction is configured to transition the first plurality of clamp members from the withdrawn positions to the gripping positions;
   wherein the rotation of the first cam gear relative to the torque gear about the central axis of the clamp assembly in a second direction opposite the first direction is configured to transition the first plurality of clamp members from the gripping positions to the withdrawn positions.

3. The clamping system of claim 1, wherein each cam surface has a first end and a second end circumferentially opposite the first end, wherein each cam surface curves radially outward moving from the first end to the second end.

4. The clamping system of claim 3, wherein the second end of each cam surface comprises a semi-circular concave pocket.

5. The clamping system of claim 3, wherein each clamp member has a pinned end pivotally coupled to the torque gear and a free end opposite the pinned end; and
   wherein the free end is biased into engagement with the corresponding cam surface.

6. The clamping system of claim 5, wherein each clamp member has a radially inner surface extending from the pinned end to the free end and a radially outer surface extending from the pinned end to the free end;
   wherein a wheel is rotatably coupled to each clamp member along the radially outer surface at the free end, wherein the wheel is configured to roll along the corresponding cam surface.

7. The clamping system of claim 1, wherein the clamp assembly further includes a second cam gear and a second plurality of clamp members disposed within the second cam gear;
   wherein the second cam gear has a radially inner surface comprising a plurality of circumferentially adjacent concave recesses defining a plurality of circumferentially adjacent cam surfaces, wherein one clamp member of the second plurality of clamp members is disposed in each recess of the second cam gear.

8. The clamping system of claim 7, wherein the clamp actuator includes a second clamp drive gear that engages the second cam gear and is configured to rotate the second cam gear.

9. The clamping system of claim 7, wherein the rotation of the first cam gear relative to the torque gear about the central axis of the clamp assembly in a first direction is configured to transition the first plurality of clamp members from the withdrawn positions to the gripping positions;
   wherein the rotation of the first cam gear relative to the torque gear about the central axis of the clamp assembly in a second direction opposite the first direction is configured to transition the first plurality of clamp members from the gripping positions to the withdrawn positions;
   wherein the rotation of the second cam gear relative to the torque gear about the central axis of the clamp assembly in a third direction is configured to transition the second plurality of clamp members from the withdrawn positions to the gripping positions;
   wherein the rotation of the second cam gear relative to the torque gear about the central axis of the clamp assembly in a fourth direction opposite the third direction is configured to transition the second plurality of clamp members from the gripping positions to the withdrawn positions;
   wherein the third direction is opposite the first direction.

10. The clamping system of claim 1, wherein the mounting shaft is rotationally fixed relative to the central axis of the clamp actuator;
    wherein the first clamp drive gear and the torque drive gear each comprise a planetary gear set including an annular ring gear, a plurality of circumferentially-spaced planet gears radially disposed within the ring gear, and a central sun gear radially disposed within the planet gears;

wherein the sun gear of the first clamp drive gear is disposed on a sleeve rotatably mounted to the mounting shaft;

wherein the sun gear of the torque drive gear is fixed to the mounting shaft.

11. The clamping system of claim 10, wherein the clamp actuator further comprises a plurality of circumferentially spaced pins, wherein one planet gear of the first clamp drive gear and one planet gear of the torque drive gear is rotatably coupled to each pin.

12. The clamping system of claim 10, wherein the planet gears of the first clamp drive gear and the planet gears of the torque drive gear are configured to orbit together about the central axis of the clamp actuator.

13. An actuator for operating a clamp assembly, the actuator comprising:
 a mounting shaft having a central axis, wherein the mounting shaft is rotationally fixed relative to the central axis;
 a first planetary gear set rotatably coupled to the mounting shaft; and
 a second planetary gear set rotatably coupled to the mounting shaft;
 wherein each planetary gear set includes an annular ring gear, a plurality of circumferentially-spaced planet gears radially disposed within the ring gear, and a central sun gear radially disposed within the planet gears;
 wherein the sun gear of the first planetary gear set is disposed on a first sleeve rotatably mounted to the mounting shaft;
 wherein the sun gear of the second planetary gear set is fixed to the mounting shaft.

14. The actuator of claim 13, wherein the first planetary gear set is configured to rotate about the central axis independent of the second planetary gear set.

15. The actuator of claim 13, further comprising:
 a first motor configured to rotate the first sleeve about the central axis;
 a second motor configured to rotate the ring gear of the second planetary gear set about the central axis.

16. The actuator of claim 15, further comprising a plurality of circumferentially spaced pins, wherein one planet gear of the first planetary gear set is rotatably coupled to each pin and one planet gear of the second planetary gear set is rotatably coupled to each pin.

17. The actuator of claim 16, further comprising a pin carrier including a plurality of circumferentially-spaced guide holes, wherein each pin extends through one of the guide holes.

18. The actuator of claim 13, wherein the planet gears of the first planetary gear set and the planet gears of the second planetary gear set are configured to orbit together about the central axis.

19. The actuator of claim 13, further comprising a third planetary gear set rotatably coupled to the mounting shaft, wherein the sun gear of the third planetary gear set is disposed on a second sleeve rotatably mounted to the mounting shaft.

20. The actuator of claim 19, further comprising:
 a first motor configured to simultaneously rotate the first sleeve about the central axis in a first direction and rotate the second sleeve about the central axis in a second direction that is opposite the first direction;
 a second motor configured to rotate the ring gear of the second planetary gear set about the central axis.

21. The actuator of claim 19, further comprising a plurality of circumferentially spaced pins, wherein one planet gear of the first planetary gear set is rotatably coupled to each pin, one planet gear of the second planetary gear set is rotatably coupled to each pin, and one planet gear of the third planetary gear set is rotatably coupled to each pin.

22. The actuator of claim 21, further comprising a pin carrier including a plurality of circumferentially-spaced guide holes, wherein each pin extends through one of the guide holes.

23. The actuator of claim 19, wherein the planet gears of the first planetary gear set, the planet gears of the second planetary gear set, and the planet gears of the third planetary gear set are configured to orbit together about the central axis.

24. A clamping assembly for gripping and rotating a tubular, the assembly having a central axis and comprising:
 a first cam gear configured to rotate about the central axis and having a radially inner surface comprising a plurality of circumferentially adjacent concave recesses defining a plurality of cam surfaces;
 a first plurality of clamp members, wherein each clamp member of the first plurality of clamp members is disposed in one recess of the first cam gear;
 a torque gear configured to rotate about the central axis, wherein the first cam gear is configured to rotate relative to the torque gear;
 wherein each clamp member is pivotally coupled to the torque gear;
 wherein each clamp member is configured to pivot between a withdraw position radially spaced apart from the tubular and a gripping position engaging the first tubular.

25. The clamping assembly of claim 24, wherein the rotation of the first cam gear relative to the torque gear about the central axis in a first direction is configured to transition the first plurality of clamp members from the withdrawn positions to the gripping positions;
 wherein the rotation of the first cam gear relative to the torque gear about the central axis in a second direction opposite the first direction is configured to transition the first plurality of clamp members from the gripping positions to the withdrawn positions.

26. The clamping assembly of claim 24, wherein each cam surface has a first end and a second end circumferentially opposite the first end, wherein each cam surface curves radially outward moving from the first end to the second end.

27. The clamping assembly of claim 26, wherein each clamp member has a pinned end pivotally coupled to the torque gear and a free end opposite the pinned end; and
 wherein the free end is biased radially outward toward the corresponding cam surface.

28. The clamping assembly of claim 27, wherein each clamp member has a radially inner surface extending from the pinned end to the free end and a radially outer surface extending from the pinned end to the free end;
 wherein a wheel is rotatably coupled to each clamp member along the radially outer surface at the free end, wherein the wheel is configured to roll along the corresponding cam surface.

29. The clamping assembly of claim 24, wherein the clamp assembly further includes a second cam gear and a second plurality of clamp members disposed within the second cam gear, wherein the second cam gear is configured to rotate relative to the torque gear;

wherein the second cam gear has a radially inner surface comprising a plurality of circumferentially adjacent concave recesses defining a plurality of circumferentially adjacent cam surfaces, wherein each clamp member of the second plurality of clamp members is disposed in one recess of the second cam gear.

30. The clamping assembly of claim 29, wherein the rotation of the first cam gear relative to the torque gear about the central axis in a first direction is configured to transition the first plurality of clamp members from the withdrawn positions to the gripping positions;
  wherein the rotation of the first cam gear relative to the torque gear about the central axis in a second direction opposite the first direction is configured to transition the first plurality of clamp members from the gripping positions to the withdrawn positions;
  wherein the rotation of the second cam gear relative to the torque gear about the central axis in a third direction is configured to transition the second plurality of clamp members from the withdrawn positions to the gripping positions;
  wherein the rotation of the second cam gear relative to the torque gear about the central axis in a fourth direction opposite the third direction is configured to transition the second plurality of clamp members from the gripping positions to the withdrawn positions;
  wherein the third direction is opposite the first direction.

* * * * *